may be made from stainless steel or any other desired material.

The present invention may be embodied in other specific forms without departing from the spirit or essential attributes thereof and accordingly, reference should be made to the appended claims rather than to the foregoing specification as indicating the scope of the invention.

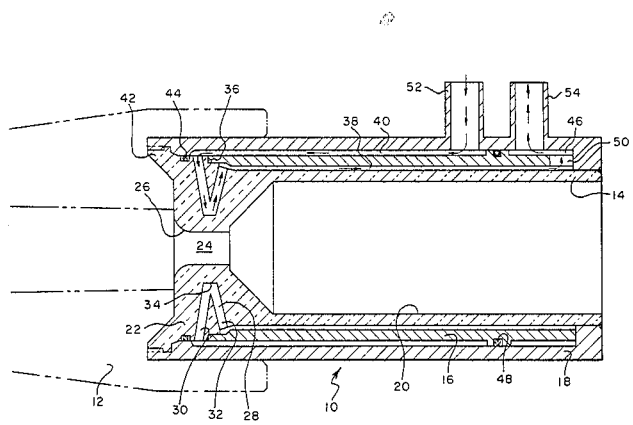

I claim:

1. A taphole for a melting furnace comprising:
   a metallic member having an axially extending inner working surface defining an orifice and a substantially tubular portion through which molten material from a furnace can pass;
   a coolant guide disposed coaxially around at least part of said tubular portion and closely spaced therefrom thereby defining an annular space therebetween extending substantially the length of said coolant guide and forming a first highly restrictive narrow flow passage;
   a second highly restrictive narrow flow passage in the area around said orifice, said second passage being in relatively close proximity to but being isolated from said working surface; and
   liquid coolant supply means in communication with said passages for supplying coolant thereto whereby the velocity of the coolant will be accelerated to an ultrahigh velocity across and against the surface of the passage walls as it passes through the passages.

2. The taphole as claimed in claim 1 wherein said second passage is formed in said metallic member.

3. The taphole as claimed in claim 2 wherein said second passage surrounds said orifice.

4. The taphole as claimed in claim 1 wherein said second passage includes a tunnel-like passageway formed in the metallic member adjacent said orifice and including first and second openings in the outer wall of said member, one of said openings being an inlet for said coolant and the other functioning as an outlet therefor.

5. The taphole as claimed in claim 4 wherein said second passage includes a plurality of said passageways, each including first and second openings, all said first openings being in communication with each other and all said second openings being in communication with each other.

6. The taphole as claimed in claim 1 further including an outer tubular jacket coaxially arranged around said coolant guide and being spaced therefrom to provide a path for said liquid coolant, said path being in communication with said passageways through said second openings.

7. The taphole as claimed in claim 1 wherein said metallic member is comprised of copper.

8. The taphole as claimed in claim 1 wherein said orifice has an inner diameter which is less than the inner diameter of said tubular portion.

* * * * *

ULTRAHIGH VELOCITY WATER-COOLED COPPER TAPHOLE

BACKGROUND OF THE INVENTION

The present invention is directed toward a taphole for use with a melting furnace and more particularly toward an ultrahigh velocity water-cooled copper taphole.

Because of the extremely high heat generated by the molten material flowing through the taphole of a melting furnace, it has been known for sometime that provisions must be made for cooling such tapholes. This has been conventionally accomplished by constructing the taphole from steel and water cooling the steel. However, this approach has been less than effective and results in an unpredictable, varying buildup or "skull," of solid material at the working surface of the cooled metal and a correspondingly uneven discharge of molten material.

As explained more fully in applicant's U.S. Pat. No. 4,032,705 (the entire subject matter thereof being included herein by reference), applicant has discovered that the rapid, consistent removal of large quantities of energy (in the range of 1 BTU per square inch per second) through a water-cooled metal barrier, without damage to that barrier, requires that the metal have excellent thermal conductivity and a reasonably high melting point, and be force-cooled at a constant temperature by the creation and efficient removal of steam at its back face.

Converting 1 pound of water into steam requires 967 BTU's of heat at 212° F. (or 536 calories per gram at 100° C.). If water can be made to present itself consistently to the area to be cooled and there to turn into steam, and then to leave the area immediately to make room for more water to arrive, a highly efficient and predictable cooling system results. The area to be cooled must, of course, be kept free of accretion to obviate the film effects which are adverse to efficient thermal transfer.

Experimentation has shown that the best way to remove the steam film as rapidly as it forms is by applying ultrahigh velocity cooling water to the back surface of the metal barrier. A cooling water velocity of at least 10 feet per second has proved to be required, and this velocity must be at the surface of the metal, not merely at the center of a substantial cooling passage of which the metal barrier is one of the walls. The preferred water cooling velocity is at least 20 feet per second. It should be readily apparent that such velocities require high flow rates through small passages, thereby generating pressure drops of the order of 20 to 60 psi, depending on the surfaces, shapes and length of the area to be cooled.

To enhance the effectiveness of this cooling, a readily workable metal of reasonable cost and melting point and high thermal conductivity is required. From a table of the physical properties of the elements, a selection of an easily workable, relatively inexpensive material with a melting point above 1,000° C. and good thermal transfer capability results in the following list:

| ELEMENT | MELTING POINT (°C.) | CONDUCTIVITY (calgmcm/sqcm/sec/°C.) |
| --- | --- | --- |
| Chromium (Cr) | 1875 | 0.16 |
| Copper (Cu) | 1083 | 0.943 |
| Iron (Fe) | 1537 | 0.18 |
| Molybdenum (Mo) | 2610 | 0.34 |
| Nickel (Ni) | 1453 | 0.22 |
| Silver (Ag) | 960 | 1.00 (for comparison) |

Chromium, molybdenum and nickel are not really easily workable and they are relatively expensive. Furthermore, these materials have thermal conductivities which are from 3 to 5 times poorer than that of copper.

Because of the relatively low melting point of copper and the corresponding higher melting point of iron, the automatic and quite incorrect choice in the past for a water-cooled taphole has been steel. This has been true even though it has a thermal transfer ability less than 1/5 that of copper. Furthermore, for a number of reasons, the water-cooled steel has a tendency to form films thereon of a highly insulating nature.

Compounding this technical felony is the fact that, to applicant's knowledge, no attempt has been made to ensure the efficient removal of heat energy from the back face of the taphole orifice by the encouragement of steam formation, against a clean surface, made effective by the immediate removal of that steam by new cooling water moving at "ultrahigh velocity." It should be pointed out that the use of stainless steel only makes matters worse since stainless steel grades have thermal transfer abilities 16 to 24 times poorer than copper.

SUMMARY OF THE INVENTION

The present invention overcomes the problems of the prior art and provides a taphole orifice which allows a film of solid material of predictable, constant thickness to freeze on its working face so that the discharge of molten material is smooth and consistent. The taphole according to the invention includes a cylindrically shaped copper shell having a central opening through which molten material from a furnace passes and includes a reduced inner diameter portion defining an orifice. A plurality of narrow holes are formed in the shell wall adjacent the orifice but isolated therefrom and are interconnected to form a plurality of highly restrictive flow passages. Coaxially arranged about the copper shell is a coolant guide having a surface which is closely spaced from the copper thereby defining another highly restrictive flow passage which is also in communication with the plurality of passages around the orifice. A liquid coolant is supplied to the passages where the velocity of the same is made to accelerate to an ultrahigh velocity of at least 10 feet per second across nonworking surfaces of the copper shell forming parts of said passages to thereby sweep away steam generated upon the surfaces.

BRIEF DESCRIPTION OF THE DRAWING

For the purpose of illustrating the invention, there is shown in the accompanying drawing one form which is presently preferred; it being understood that the invention is not intended to be limited to the precise arrangements and instrumentalities shown.

The sole FIGURE is a cross-sectional view of an ultrahigh velocity water-cooled copper taphole con-

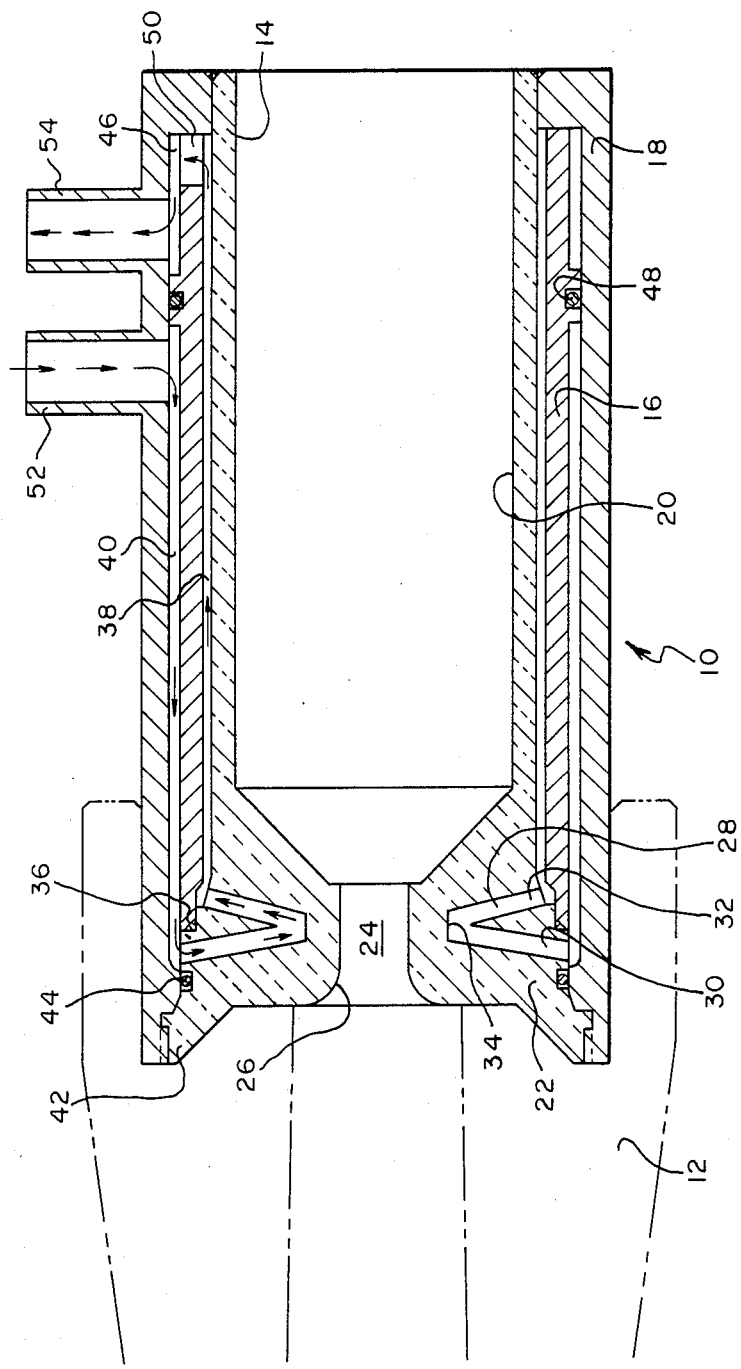

United States Patent [19]

Wooding

[11] Patent Number: 4,498,610
[45] Date of Patent: Feb. 12, 1985

[54] ULTRAHIGH VELOCITY WATER-COOLED COPPER TAPHOLE

[75] Inventor: Patrick J. Wooding, Moorestown, N.J.

[73] Assignee: Wooding, Indian Mills, N.J.

[21] Appl. No.: 311,042

[22] Filed: Oct. 13, 1981

[51] Int. Cl.³ .............................................. B22D 41/08
[52] U.S. Cl. .................................. 222/592; 222/590; 222/591; 373/79
[58] Field of Search .......................... 266/46, 241, 270; 164/303, 309, 316, 337; 222/592, 593, 146 C, 591, 590; 373/76, 79

[56] References Cited

U.S. PATENT DOCUMENTS

| 399,263 | 3/1889 | Hartman | 266/270 X |
| 2,225,660 | 12/1940 | Rogers | 222/593 X |
| 2,827,279 | 3/1958 | Cox | 266/270 X |
| 4,271,993 | 6/1981 | Anderson | 222/592 X |

FOREIGN PATENT DOCUMENTS 1527380  5/1968  France .................. 222/592

48-8363  3/1973  Japan .................... 266/270

Primary Examiner—David A. Scherbel
Attorney, Agent, or Firm—Duffield & Lehrer

[57] ABSTRACT

A taphole for a melting furnace includes a cylindrically shaped copper shell having a central opening through which molten material from a furnace passes and includes a reduced inner diameter portion defining an orifice. A plurality of narrow holes are formed in the shell wall adjacent the orifice but isolated therefrom and are interconnected to form a plurality of highly restrictive flow passages. Coaxially arranged about the copper shell is a coolant guide having a surface which is closely spaced from the copper thereby defining another highly restrictive flow passage which is also in communication with the plurality of passages around the orifice. A liquid coolant is supplied to the passages where the velocity of the same is made to accelerate to an ultrahigh velocity of at least 10 feet per second across nonworking surfaces of the copper shell forming parts of said passages to thereby sweep away steam generated upon the surfaces.

8 Claims, 1 Drawing Figure